Figures 5, 6:
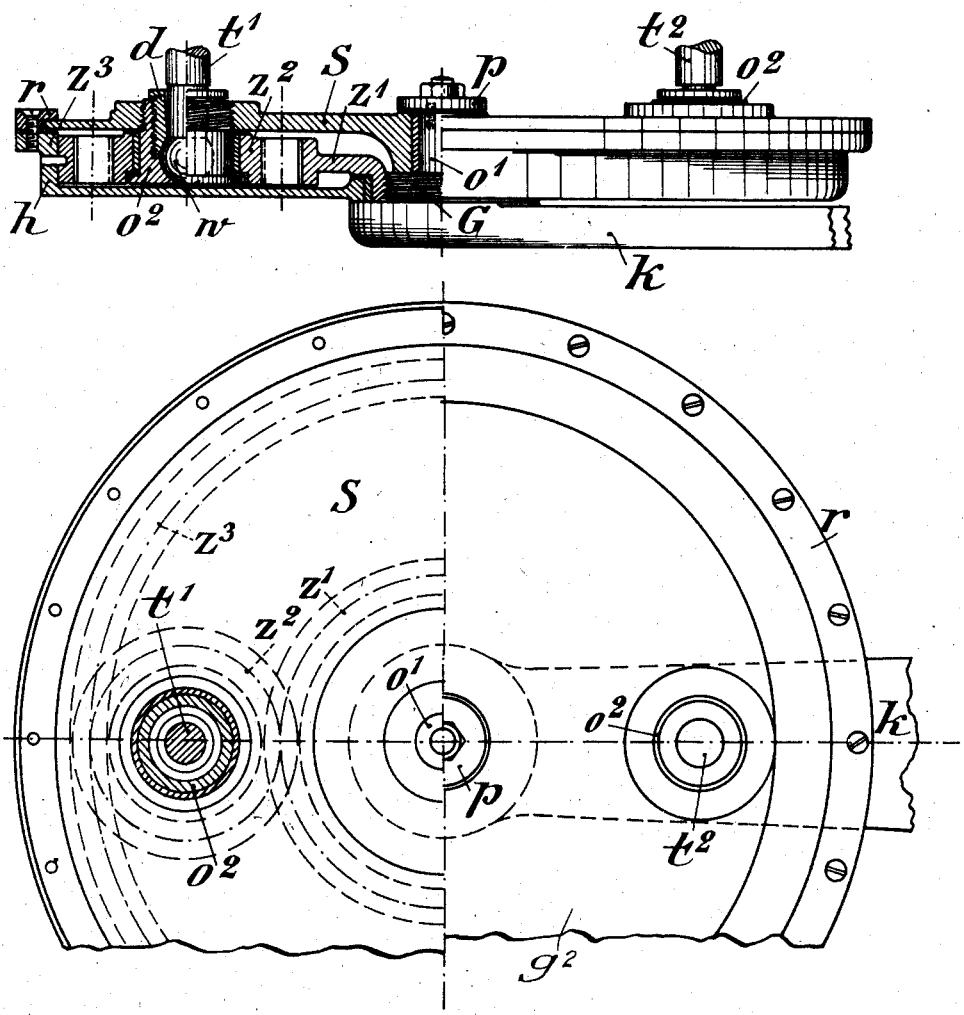

No. 854,038. PATENTED MAY 21, 1907.
H. HÜCKEL.
MACHINE WITH REVOLVING WINGS OR BLADES, APPLICABLE EITHER AS PROPELLER, MOTOR, PUMP, OR BLOWING ENGINE.
APPLICATION FILED APR. 16, 1904.
6 SHEETS—SHEET 1.
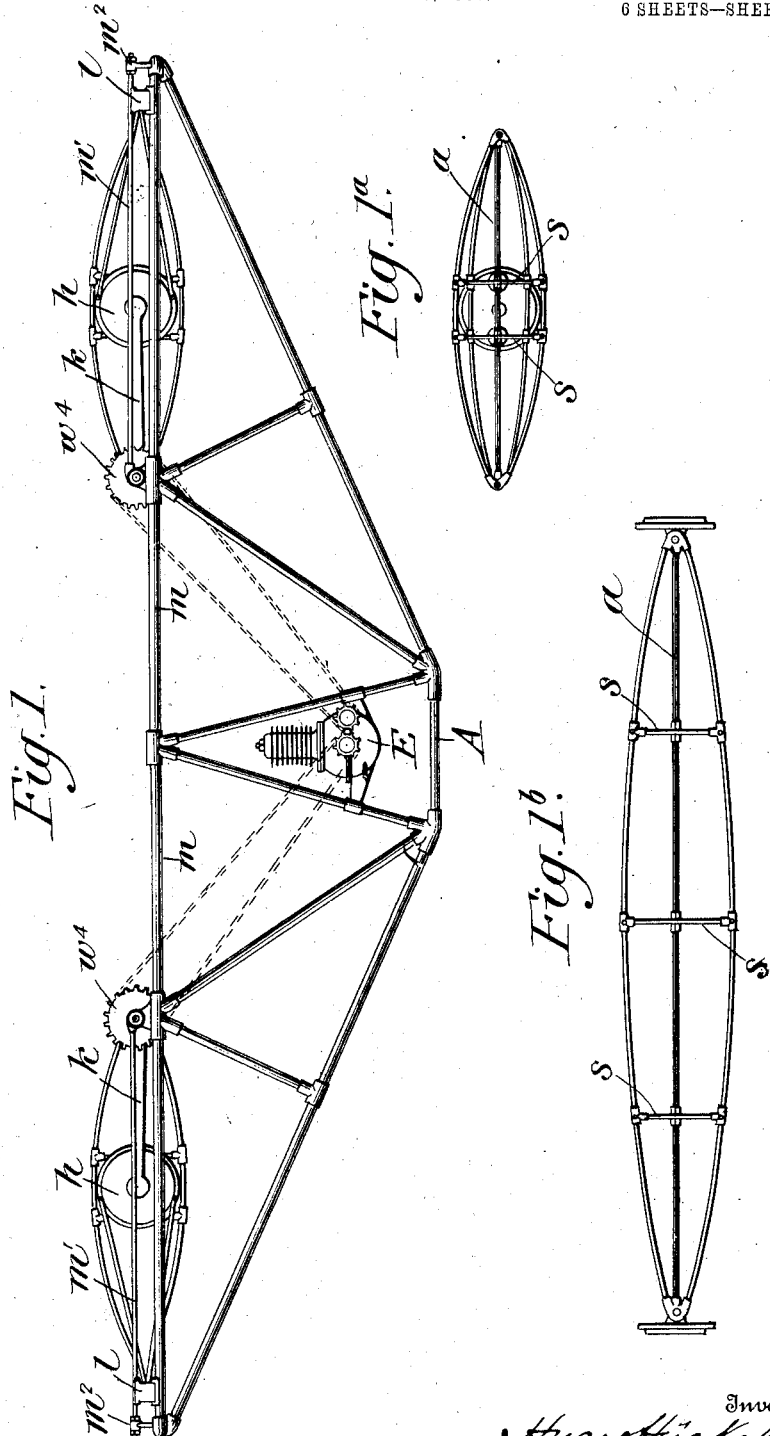

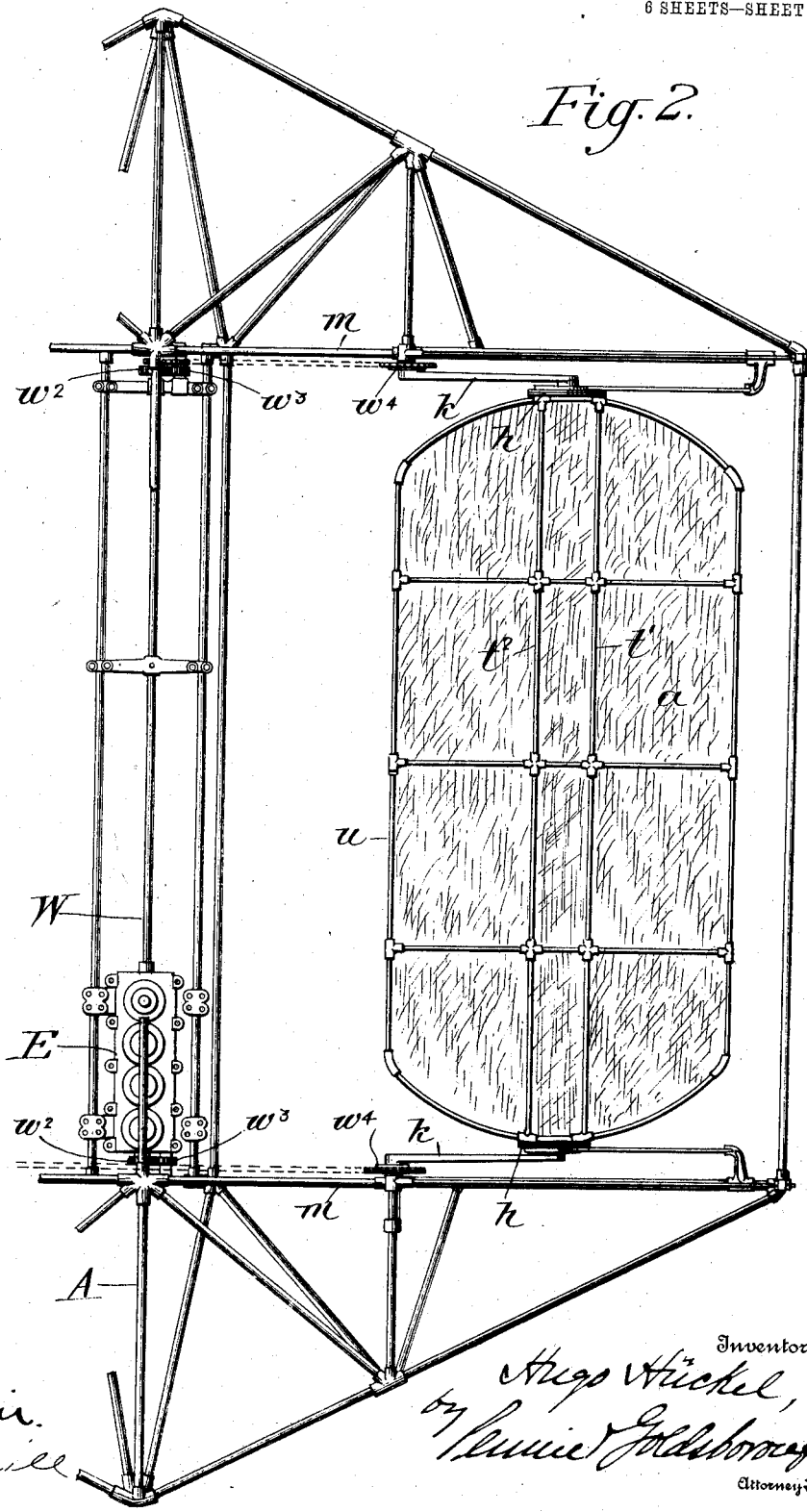

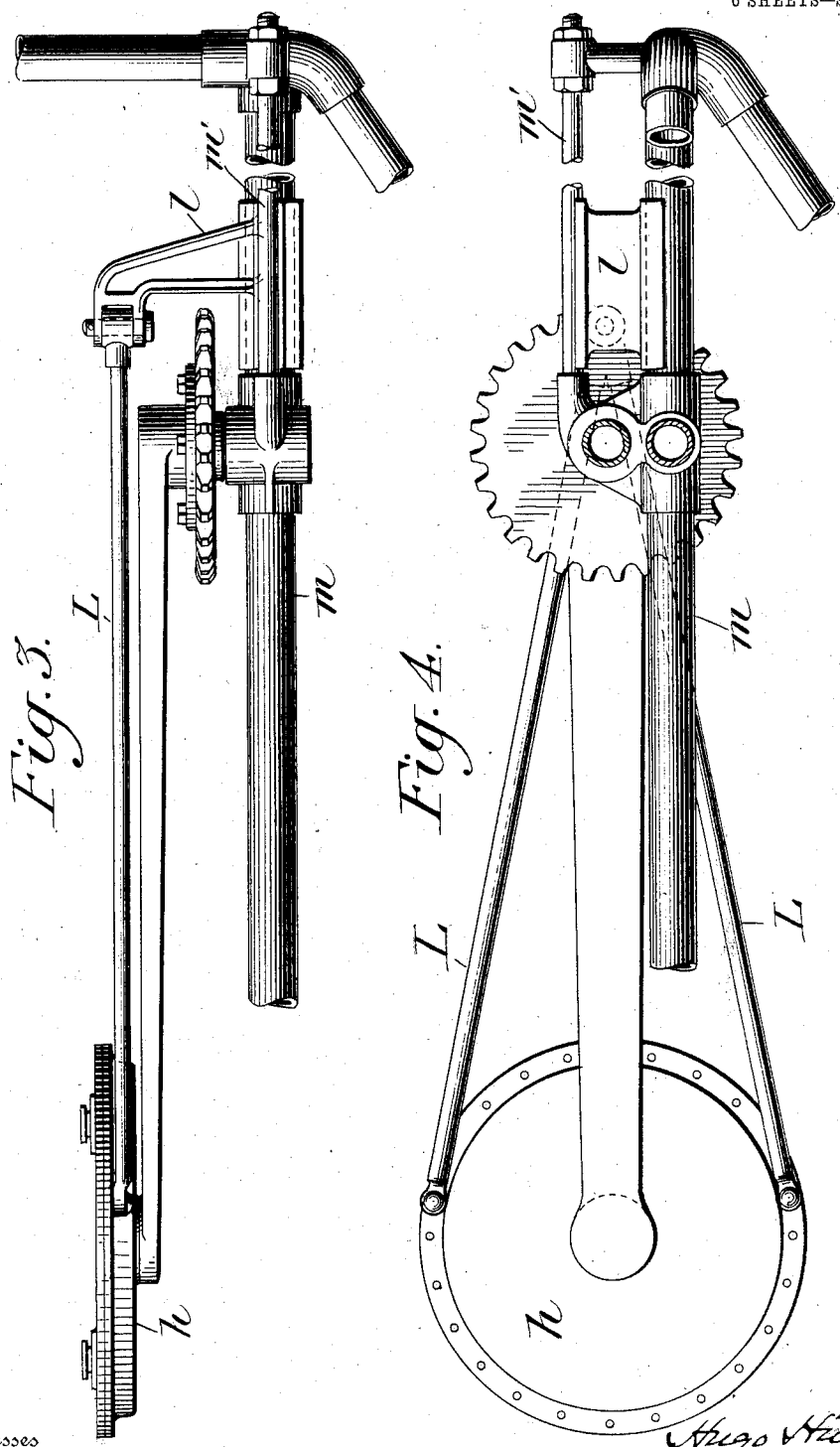

No. 854,038. PATENTED MAY 21, 1907.
H. HÜCKEL.
MACHINE WITH REVOLVING WINGS OR BLADES, APPLICABLE EITHER AS PROPELLER, MOTOR, PUMP, OR BLOWING ENGINE.
APPLICATION FILED APR. 16, 1904.

6 SHEETS—SHEET 4.

WITNESSES
A. C. Schuermann.
W. Bealle Williams

INVENTOR
Hugo Hückel
By Pennie & Goldsborough
ATTORNEYS

No. 854,038. PATENTED MAY 21, 1907.
H. HÜCKEL.
MACHINE WITH REVOLVING WINGS OR BLADES, APPLICABLE EITHER AS PROPELLER, MOTOR, PUMP, OR BLOWING ENGINE.
APPLICATION FILED APR. 16, 1904.

6 SHEETS—SHEET 5.

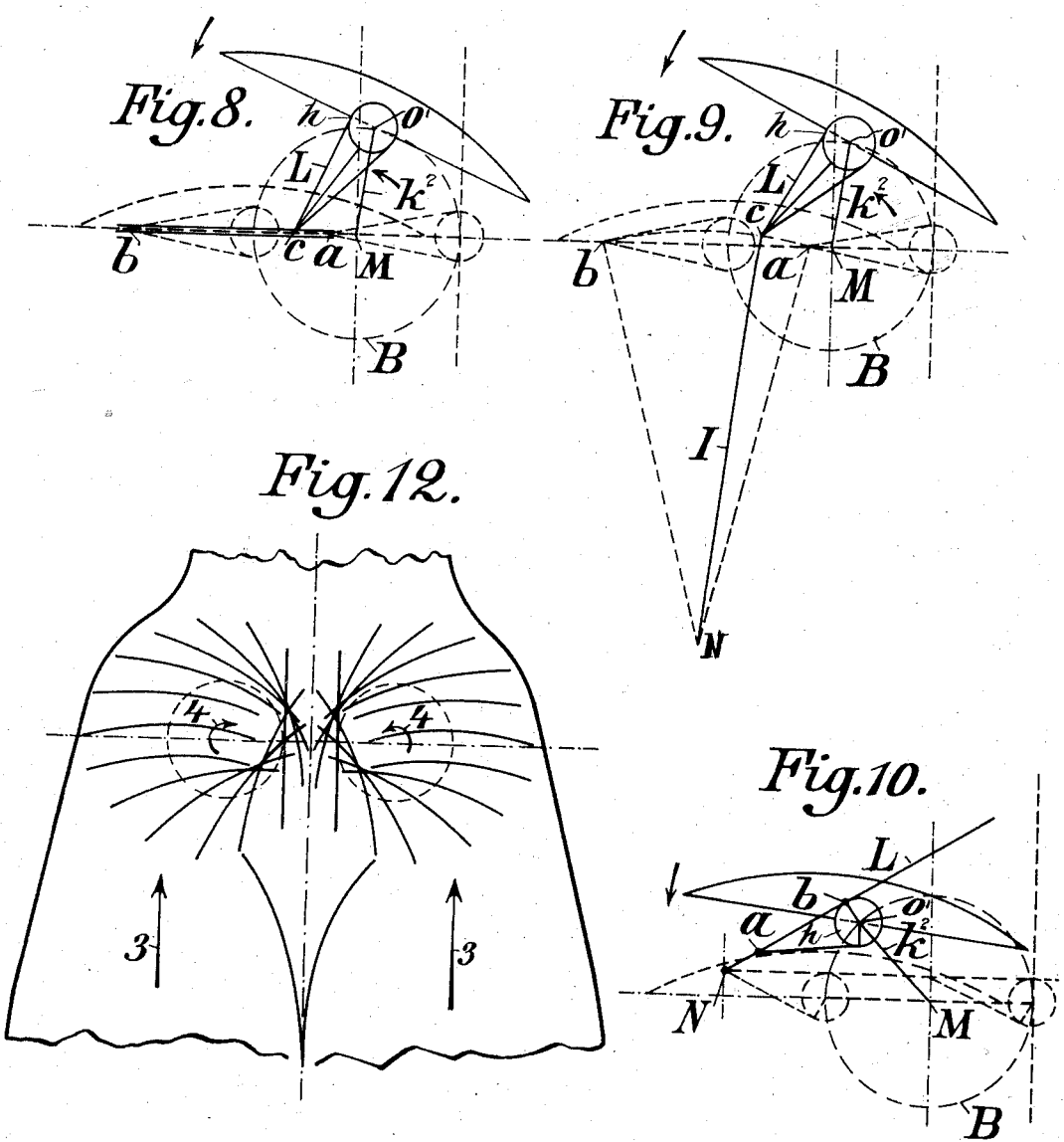

UNITED STATES PATENT OFFICE.

HUGO HÜCKEL, OF NEUTITSCHEIN, AUSTRIA-HUNGARY.

MACHINE WITH REVOLVING WINGS OR BLADES, APPLICABLE EITHER AS PROPELLER, MOTOR, PUMP, OR BLOWING-ENGINE.

No. 854,038.       Specification of Letters Patent.       Patented May 21, 1907.

Application filed April 16, 1904. Serial No. 203,490.

*To all whom it may concern:*

Be it known that I, HUGO HÜCKEL, engineer, a subject of the Austrian Emperor, residing at Neutitschein, Austria-Hungary, 36 Landstrasse, have invented certain new and useful Improvements in Machines with Revolving Wings or Blades, Applicable Either as Propeller, Motor, Pump, or Blowing-Engine, of which the following is a specification.

My invention relates to a machine having revolving wings or blades serving for the propulsion of aerial machines and navigable vessels, or for propelling fluids, but which may also serve as a motor, actuated by liquids or gases for performing mechanical work; or conversely, it may act as a pump or blowing engine for propelling liquids or gases. The machine operates with two similar, symmetrically arranged revolving wings or blades that revolve at the same speed but in contrary directions, in such manner that during one half of each revolution each wing offers to the liquid or gas the full area of its surface, while during the other half of each revolution the surface of each wing is directed approximately tangentially to its circle of rotation so as to offer a minimum of resistance to the liquid or gas. In many known machines of this kind, the change of position of the wings or blades in the described manner is effected suddenly and with a jerky action, or so that the wings do not stand during the whole of their operative semi-revolution, approximately at right angles to the direction of motion, but only approach this position gradually during such motion, so as not to attain it until about the middle thereof.

My present invention has for its object to effect the changes of position of the wings or blades uninterruptedly and without jerks in such manner that during the entire operative half of the circular motion the wings or blades are situated approximately at right angles to the direction of motion of the liquid or gas, while during the whole of the other half of the circular motion they remain in an approximately tangential direction thereto; and consequently offer a minimum amount of resistance, in particular when the machine is employed for aerial navigation.

According to the present invention the above mentioned result is obtained by continuously actuating the revolving wings or blades by means of a sun and planet wheel gear, no part of which is stationary, the middle driving wheel being rotated by a crank or equivalent device, while the outer casing of the planet system is controlled and given a definite rocking motion on its sun axis by a device that is guided outside the mechanism; by this means the change of position of the wings in the described manner is effected without interruption, so that a high degree of speed can be employed. The ratio of transmission in the sun and planet gear is quite optional, and as the whole of it revolves it can be entirely inclosed in a casing that can be filled with a liquid lubricant.

On the accompanying drawings is shown by way of example, the construction of a machine according to my invention, which is especially suited for raising the machine vertically in the air, as an air-ship. In this arrangement, as illustrated, no provision is made for propelling the machine horizontally; this motion can be effected by any known means, such for instance, as by a screw propeller or by inclining the longitudinal axes of the machine relatively to the horizon by the shifting of the center of gravity, as will be understood by those skilled in the art.

Figure 11:
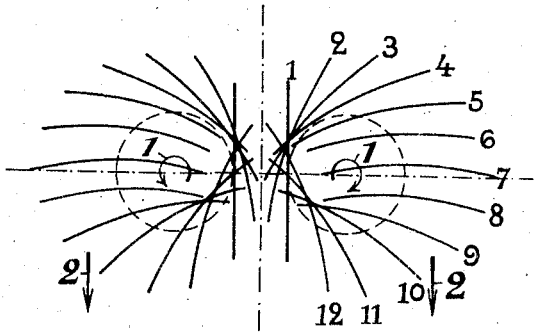

Figure 1 is an end elevation of such a machine. Fig. 1$^a$ is an end view of one wing. Fig. 1$^b$ is a longitudinal sectional view of one wing. Fig. 2 is a plan view of the parts shown in Fig. 1. Fig. 3 is a detail plan view showing the crank which operates the sun and planet mechanism and one form of the control device for the outer casing of that mechanism. Fig. 4 is an elevation of the parts shown in Fig. 3. Fig. 5 is an elevation, partly in section, of the sun and planet wheel gear. Fig. 6 is a plan thereof. Fig. 7 to 10 show diagrammatically several different arrangements of the device guiding the wing. Fig. 11 shows diagrammatically the several positions of the wings during rotation. Fig. 12 represents an arrangement of the machine to serve as motor.

The machine comprises a tubular frame work A as shown, which supports a gas engine E and its driven shaft W. This driven shaft carries at each end a pinion $w^2$ which meshes with a pinion $w^3$ on a stub shaft as shown. The driven shaft also carries at each end a sprocket wheel and each stub shaft carries a sprocket wheel. These sprocket wheels are geared by sprocket chains with the sprocket wheels $w^4$ which are supported in bearings on the upper horizontal frame members $m$, and carry the cranks $k$. The cranks $k$ carry at their outer ends the housings $h$ which contain the sun and planet mechanisms.

Each wing consists of a lensshaped framing shown in plan at Fig. 2, in cross section at Fig. 1$^a$, and in longitudinal section at Fig. 1$^b$. Within this framing is stretched a flexible sail $a$, Figs. 1$^a$ and 2, but it is only fastened at the periphery $u$ of the framing. At the points where the stays $s$ of the wings are situated the sail is formed with corresponding holes for them to pass through. When in a state of rest the sail has a flat or plane form because the periphery of the skeleton frame is situated in one and the same plane therewith. If, however, the wings be moved, or if a liquid or air current impinges upon the wings, the sail will be bulged gradually more and more until it bears with its one side against the one half of the framing.

The two main bearers $t'$ and $t^2$ of the wing framing carry at each end a spherical journal $w$, Fig. 5, each of the said journals being mounted in one of the planet gears of the sun and planet mechanism as indicated in Figs. 5 and 6.

The sun and planet gear is mounted upon the pin $o'$ of the crank $k$, the pin together with the screw thread G being made in one piece with the crank. On the screw thread G is tightly screwed the sun wheel $z'$, Figs. 5 and 6, in such manner that the pressure exercised by the toothed gear when in motion only tends to screw the wheel on tighter. Upon the crank pin $o'$ is mounted loose the disk S, held in its place by a collar $p$, and in the disk S are screwed the hollow studs $o^2$ the interiors of which in combination with the glands $d$ constitute the bearings for the journal $w$.

Loose upon the studs $o^2$ are mounted the planet wheels $z^2$ gearing on the one hand with the toothed ring $z^3$ and on the other hand with the sun wheel $z'$. The toothed ring $z^3$ is mounted in the periphery of the casing $h$ which is mounted loose on the hub of the wheel $z'$, so as to be rotated thereon and the pitch circle of the said toothed ring has a radius equal to twice the radius of the pitch circle of $z'$. For affording the toothed ring $z^3$ an effective guidance and at the same time to inclose the casing oiltight, a ring $r$, Fig. 5, is screwed on the latter, within a groove in which the edge of the disk S revolves.

Extending from the upper part of the bearing which supports the sprocket wheel $w^4$, away from the center of the machine and parallel with the horizontal frame member $m$ is a rod $m'$, which is supported at its outer end by a bracket $m^2$ on the frame of the machine. Mounted to slide between this rod and the horizontal frame member $m$ is a slide $l$ which carries a bracket $l'$, in the outer end of which is pivoted one end of a guide frame composed of forked arms L the other ends of which are secured to the casing $h$ of the sun and planet mechanism. By means of this guide frame, the casing of the sun and planet mechanism is during its rotation by the crank $k$, given a rocking motion on its own axis, in a manner similar to the pitman head of an ordinary crank motion. I have indicated diagrammatically in Figs. 7 to 10 different forms which this guide frame may take. In these figures, L represents the guide frame or bar, M represents the center of revolution of the crank $k$, $o'$ represents the center of the casing of the sun and planet mechanism, and B represents the line traced by the center $o'$ in its revolution about the center M. In the arrangement at Fig. 7, the guide bar L slides continuously through a stationary socket $x$ secured to the frame of the machine, and the distance from the center of $x$ to the point $y$, at which a line drawn from the center of $x$ to M intersects the circle B, is equal to the distance from $y$ to M. Fig. 8 illustrates diagrammatically the construction above described in detail and here the end of the guide frame L, which is indicated at a point $c$ moves to and fro in the guide groove from $a$ to $b$. In this case the distance from $c$ to $o'$ is greater than the distance from $o'$ to M. In the arrangement at Fig. 9, the end of the guide frame L indicated at the point $c$, is caused by the counterguide I which is pivoted at N to move to and fro in the circular arc $ab$. In this case also the distance from $c$ to $o'$ is greater than the distance from $o'$ to M. In the arrangement at Fig. 10 the guide bar L is pivoted at N and sockets $a$ and $b$ are rigidly secured to the casing $h$ of the sun and planet gear and these sockets embrace the guide bar L so as to slide along the same.

Figure 7:
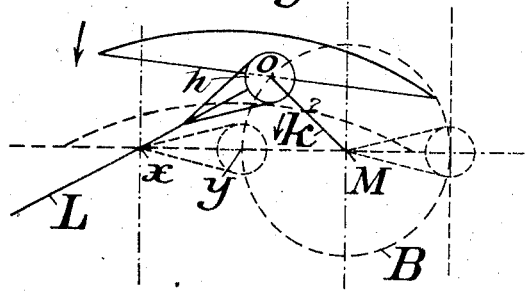

It will thus be seen that in each of the hereinbefore described arrangements, the guide frame or bar L, to which the casing $h$ is attached has its free end guided in a definite path, that is to say, in Fig. 7 it is controlled by the socket $x$, and in Fig. 8 it travels to and fro in the fixed guide from $a$ to $b$; in Fig. 9 it is caused by the rod I to travel to and fro in a circular arch $ab$; and in Fig. 10 it is made to travel to and fro in the sockets $a$ and $b$ fixed to the casing $h$. As a result, therefore, the casing $h$ while being carried around in the circle of the crank $k$ will be caused to rock on its own axis, while the crank pin $o'$, in revolving in the casing $h$, causes the sun wheel $z'$ thereon to turn the planet wheels $z^2$ so that these, and with them the disk S, are made to revolve in the casing $h$.

The pitch radius of the sun wheel $z'$ is by construction equal to one-half of the pitch radius of the circular rack $z^3$ secured to the casing $h$. Therefore, each rotation of the crank $k$ about its center, will completely rotate the sun gear $z'$ and cause the planet gears $z^2$ to travel half way around the rack $z^3$. If we follow the relative position of the parts as indicated in Fig. 8 for example, and assume that the planet gears coincide with an imaginary vertical axis of the casing $h$ when that casing has its center on a horizontal line passing through the center of the circle B, as shown at the right in Fig. 8, then as the casing rises in the direction indicated by the arrow, that is, in a counterclockwise direction, the planet gears will also be rotated in a counterclockwise direction thus tending to maintain the wing in a position tangential to the circle. This tendency is aided by counterclockwise movement of the rack $z^3$ as a whole due to the rocking of the casing $h$ on its center by the guide arms L. If we follow this motion around until the casing $h$ has its center in a vertical line passing through the center M, the planet gears by that time will have been moved around the rack $z^3$ through an angle of 45°. This point is, however, the point at which the movement of the rack $z^3$ due to the rocking of the casing $h$ on its axis by the guide arms L attains a maximum. After this point is passed the rocking is back toward the vertical position and the movement of the rack $z^3$ is in a direction opposed to the normal direction of travel of the planet gears. The tendency of the rocking motion is now to maintain the wing plane in a sine relation to the circle of rotation. As this rotation is continued and the center of the casing again coincides with a horizontal line through the center M but on the opposite side of the circle B, as shown at the left of Fig. 8, the imaginary axis of the casing $h$ will again be vertical, and the planet gears will be in the horizontal line joining the center of the casing $h$ and the point M, and the wing will therefore be in a horizontal position.

It will thus be seen that in effect the movement of the rack $z^3$ due to the rocking of the casing $h$ acts to retard the movement of the planet gears during one half revolution and to accelerate their movement during the other half revolution, and the angle through which the wing is rotated is equal to the algebraic sum of the angle through which the planet gears are moved by the sun gear and the angle through which the rack $z^3$ has been moved by the rocking of the casing $h$.

If the distance from the point $c$ at the joined ends of the guide arms L, to the center $o'$ of the casing $h$ is equal to the length of a line subtending an arc of 45° of the circle of rotation the rocking of the casing $h$ on its axis is from 0° to 45° from the vertical in each direction, and it will be apparent that when the center of the casing $h$ is in a vertical line through the center M, the 45° inclination of the imaginary axis of the casing $h$ plus the rotation of the planetary gears through an angle of 45° will bring the wing exactly tangential to the circle B at this point, and so with this specified limit of rocking, it will be found that the algebraic sum of the angle through which the imaginary axis of the casing $h$ is rocked and the angle through which the planetary gears have moved will be such as to maintain the wing approximately tangential to the circle B through the first quarter of the revolution, substantially in a sine relation to the circle of rotation during the second and third quarters of the revolution, and substantially tangential to the circle B through the fourth quarter of the revolution.

In Fig. 11 are shown 12 different positions of the wings, from which it will be seen that during the outer half of their circular motion they are situated transversely to their direction of motion, while during their return motion round the inner half of the circle they assume the same direction as that of the air or liquid, which is indicated by the arrows 2.

It will be seen that with a horizontal position of the shaft W, an upward motion of the machine will be effected by the movements of the wings shown at Fig. 11. In this arrangement, that is, when driven by means of motors, the machine can also be employed for the propulsion of liquids and gases if the whole be inclosed in a suitable casing and with inlet and outlet.

Fig. 12 shows an arrangement of the machine to serve as motor. The driving fluid flows in the direction of the arrows 3 through suitable guide channels against the wings or blades, which then revolve in the direction of the arrow 4, consequently in the reverse direction to Fig. 11. Fly wheels may be employed for passing the dead centers.

Having now particularly described and ascertained the nature of my said invention, and in what manner the same is to be performed, I declare that what I claim is:

1. In an arrangement of revolving wings or blades serving either as propeller, motor or for propelling fluids the combination of a wing or blade with a sun and planet gear, means for rotating the latter in a circular path described by a point of the wing or blade and a guide device connected to a fixed point and adapted to control the motion of the sun and planet gear, substantially as described and for the purpose set forth.

2. In an arrangement of revolving wings or blades serving either as propeller, motor or for propelling fluids a wing or blade mounted at its ends in the planet wheels of a sun and planet wheel gear, the center of which is mounted on the pin of a crank adapted to rotate the sun and planet gear and the wing in a circle, the central wheel of the sun and planet gear being fixed rigidly to the pin of the crank, a guide bar connected to a fixed point, and secured at its free end to the outer toothed ring of the sun and planet gear, substantially as described and for the purpose set forth.

3. In an arrangement of revolving wings or blades serving either as propeller, motor or for propelling fluids a wing or blade consisting of a frame with a stretched flexible sail therein and mounted at its ends in the planet wheels of a sun and planet wheel gear, the center of which is mounted on the pin of a crank adapted to rotate the sun and planet gear and the wing in a circle, the central wheel of the sun and planet gear being fixed rigidly to the pin of the crank, while the outer toothed ring thereof is connected to a guide bar being in connection with a fixed point, substantially as described and for the purpose set forth.

4. In an apparatus of the character described, a wing or blade, a sun and planet mechanism in the planet gear of which the wing or blade is supported, a crank to the free end of which the sun gear of said mechanism is rigidly connected, means for rotating said crank, and means for imparting to the sun and planet mechanism a rocking motion about its own axis in opposition to the direction of normal travel of the planet gear during one half revolution and in conjunction with such direction of travel during the other half revolution, substantially as described.

5. In an apparatus of the character described, a crank, means for rotating said crank, a sun gear secured to the free end of said crank, planet gears meshing with said sun gear, a casing for said gears, a circular rack secured to said casing having a pitch radius equal to twice the pitch radius of the sun gear and meshing with the planet gears, means for imparting to said circular rack during the rotation of the sun gear a rocking motion on its own axis in opposition to the normal direction of travel of the planet gears during one half revolution and in conjunction with said direction of travel during the other half revolution, and a wing or blade mounted in the planet gears, substantially as described.

6. In an apparatus of the character described, a crank, means for rotating said crank, a sun gear secured to the free end of said crank, planet gears meshing with said sun gear, a casing for said gears, a circular rack secured to said casing having a pitch radius equal to twice the pitch radius of the sun gear and meshing with the planet gears, a reciprocating guide block mounted in proximity to said casing, a director rigidly secured at one end to the casing and pivoted at the other end to the reciprocating guide block, and a wing or blade mounted in the planet gears, substantially as described.

In testimony whereof I have signed my name to this specification in presence of two witnesses.

HUGO HÜCKEL.

Witnesses:
  ALVESTO S. HOGUE,
  AUGUST FUGGER.